US006417645B1

(12) United States Patent
Yamaguchi et al.

(10) Patent No.: US 6,417,645 B1
(45) Date of Patent: Jul. 9, 2002

(54) COMBINATION HOLDER AND BATTERY CHARGER

(75) Inventors: Takashi Yamaguchi; Aya Watanabe; Keizo Ganse; Mikihiro Yamashita; Hideki Tanaka, all of Kadoma (JP)

(73) Assignee: Matsushita Electric Works, Ltd., Kadoma (JP)

( * ) Notice: Subject to any disclaimer, the term of this patent is extended or adjusted under 35 U.S.C. 154(b) by 0 days.

(21) Appl. No.: 09/874,279

(22) Filed: Jun. 6, 2001

(30) Foreign Application Priority Data

Jun. 7, 2000 (JP) ....................................... 2000-171267
Jun. 7, 2000 (JP) ....................................... 2000-171268

(51) Int. Cl.⁷ ............................................. H01M 10/46
(52) U.S. Cl. ...................................................... 320/115
(58) Field of Search ................................ 320/107, 112, 320/113, 114, 115

(56) References Cited

U.S. PATENT DOCUMENTS 5,189,358 A * 2/1993 Tomura et al.
5,537,022 A * 7/1996 Huang
5,844,472 A * 12/1998 Lee

FOREIGN PATENT DOCUMENTS

EP          0 722 858          7/1996

* cited by examiner

*Primary Examiner*—Edward H. Tso
(74) *Attorney, Agent, or Firm*—Oblon, Spivak, McClelland, Maier & Neustadt, P.C.

(57) ABSTRACT

A combination holder and battery charger for holding a battery operated electric appliance and also for recharging the battery in the electric appliance includes a housing having top and bottom surfaces opposite to each other. An auxiliary base stand is operatively disposed on the bottom surface of the housing and capable of assuming one of first and second states. This auxiliary base stand when in the first position has at least a portion thereof protruding laterally outwardly from a contour of the bottom surface of the housing, but that portion of the auxiliary base stand to enable the combination holder and battery charger to be supported stably on a support surface. The combination holder and battery charger may include a wall attachment for securement of the combination charger and holder to a wall surface.

28 Claims, 9 Drawing Sheets

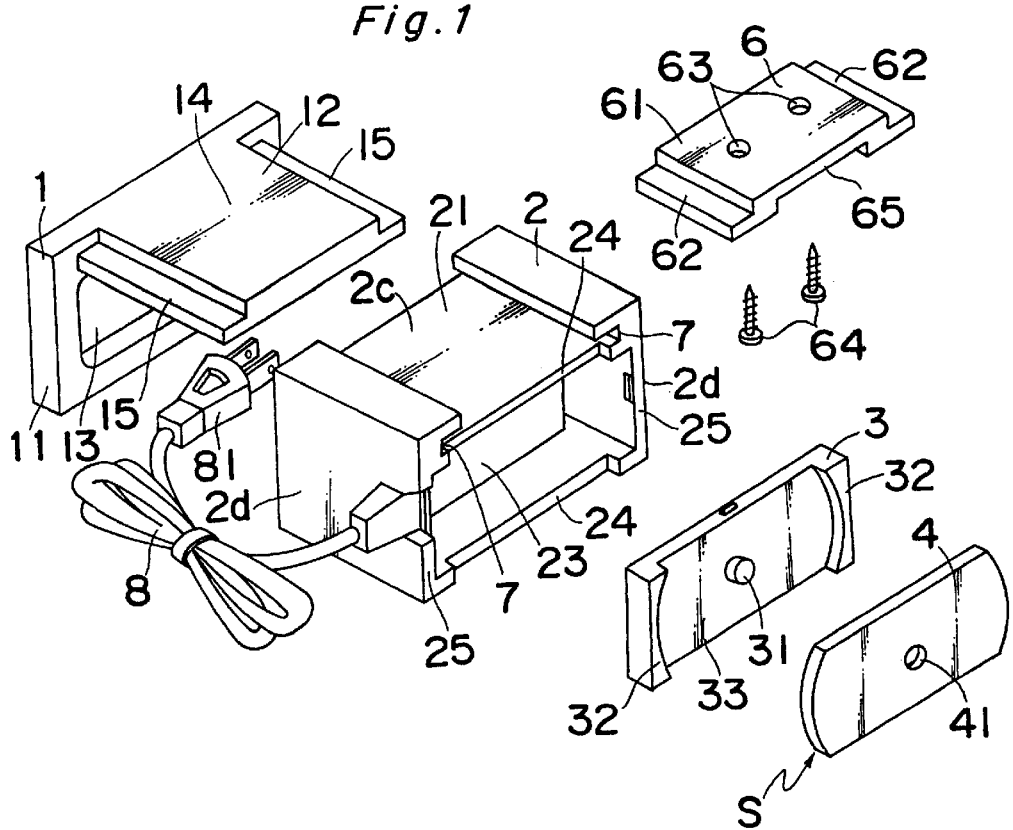
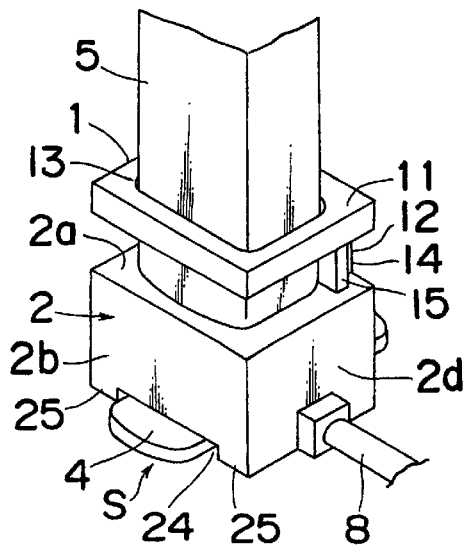
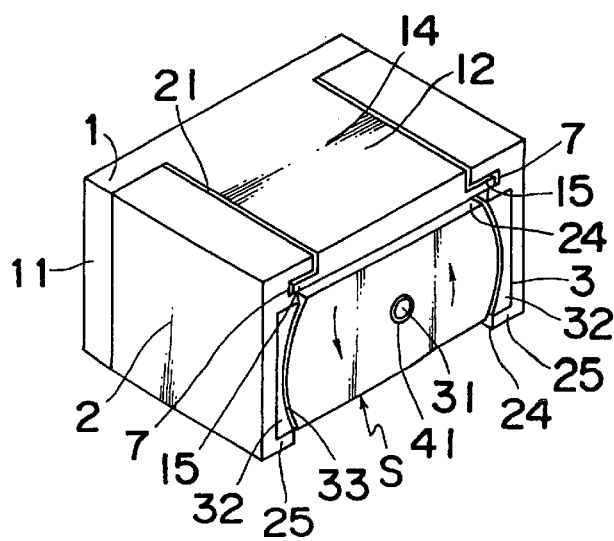

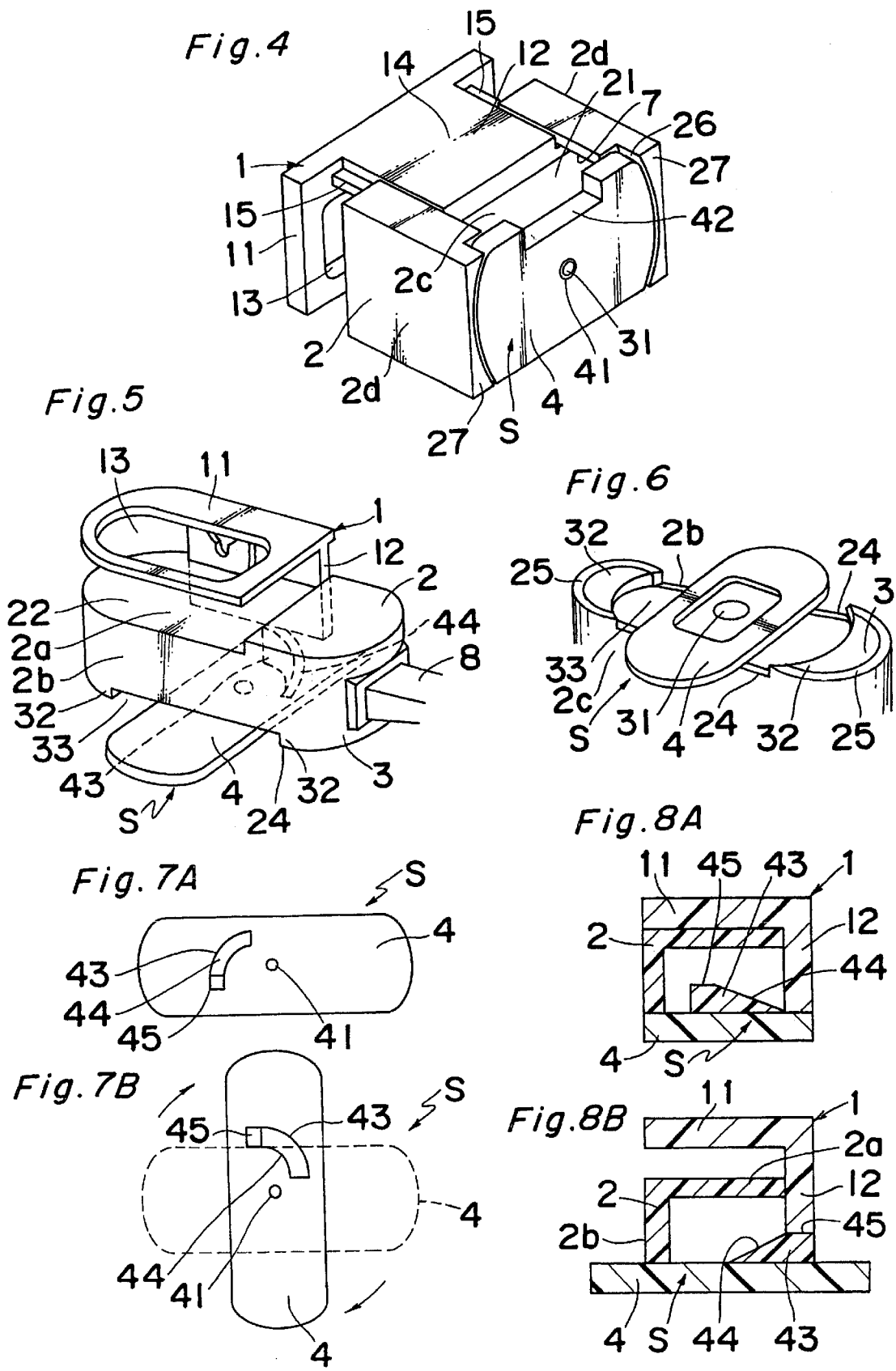

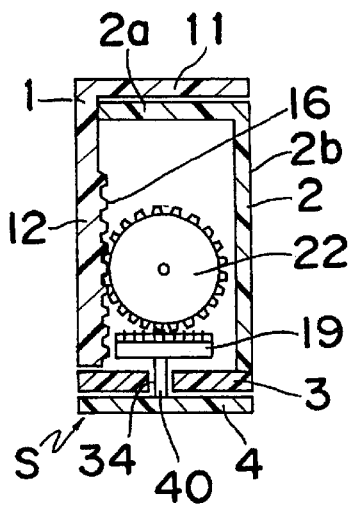
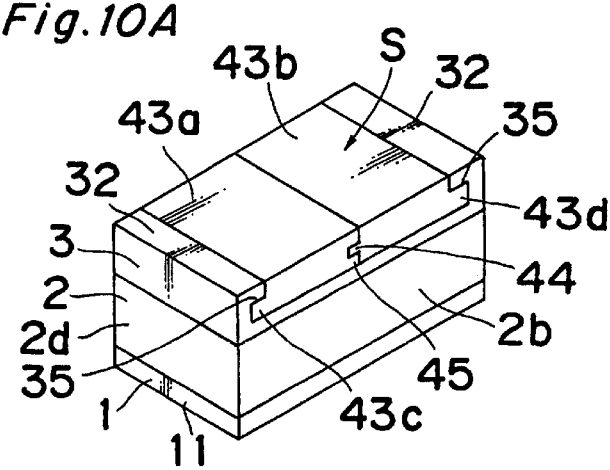
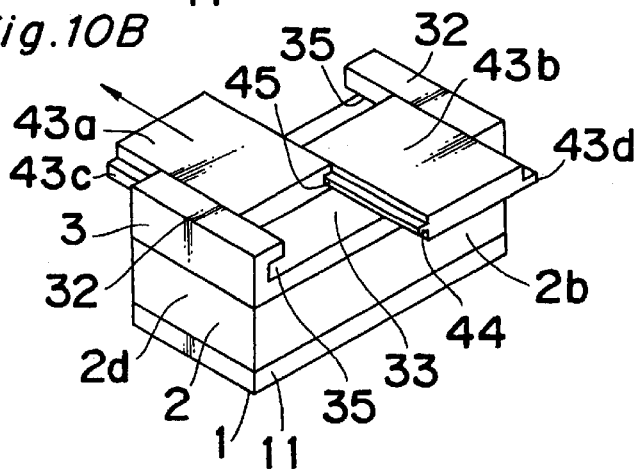
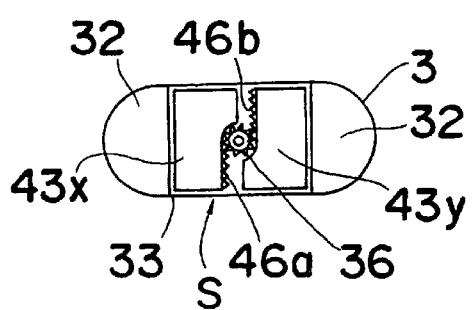
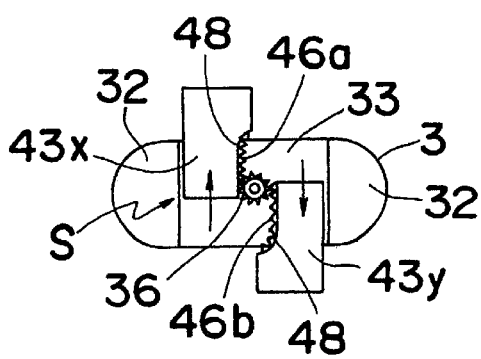

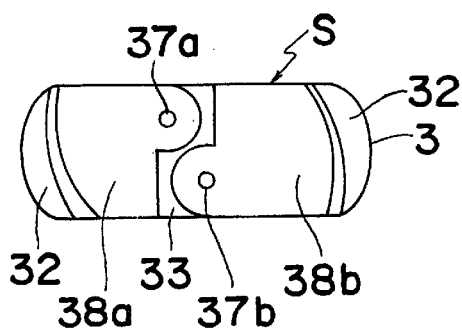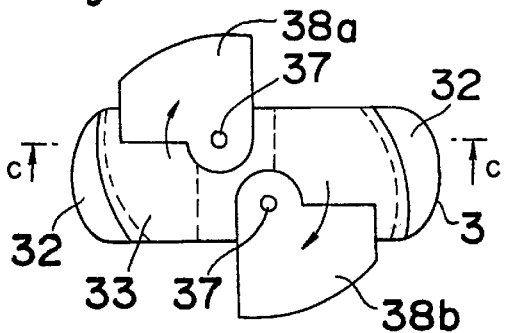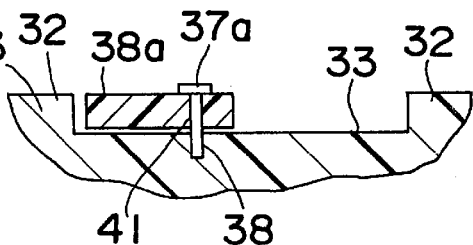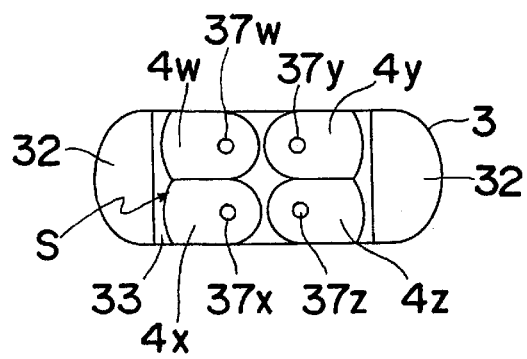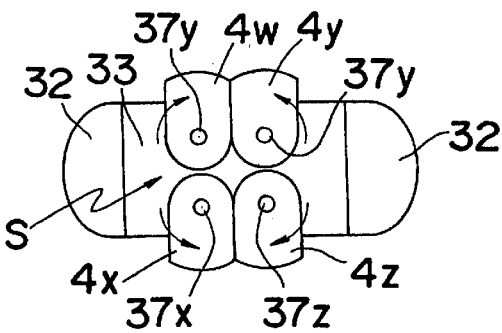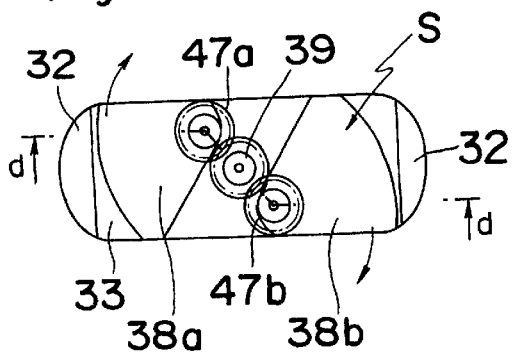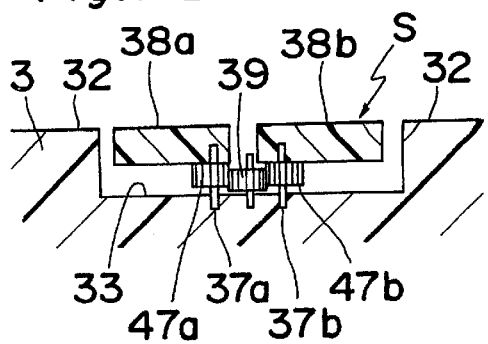

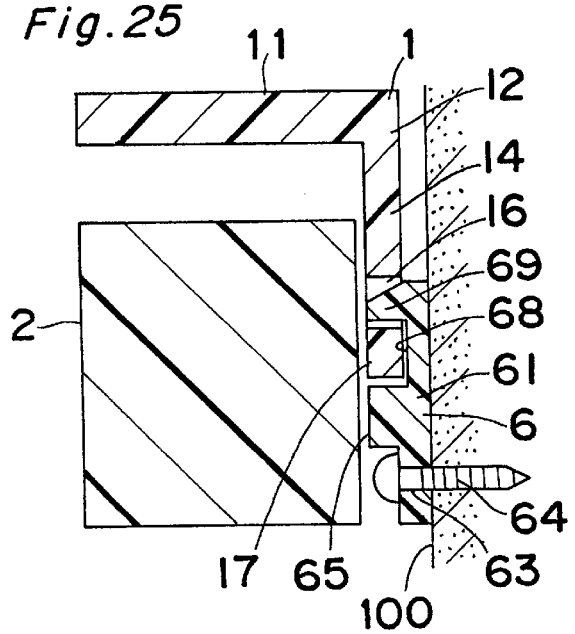
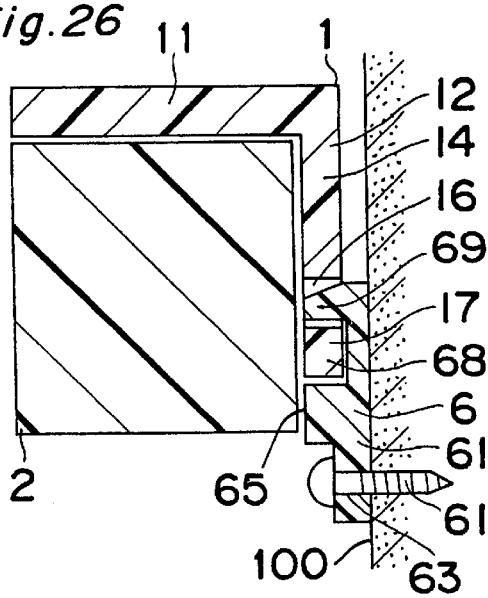
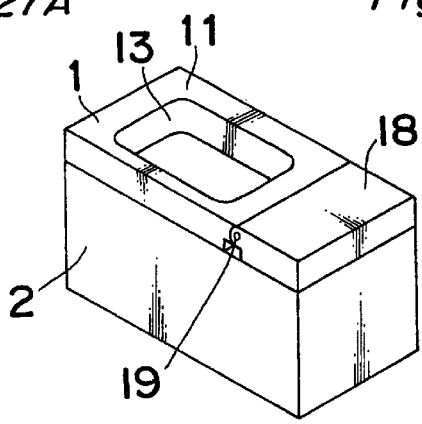
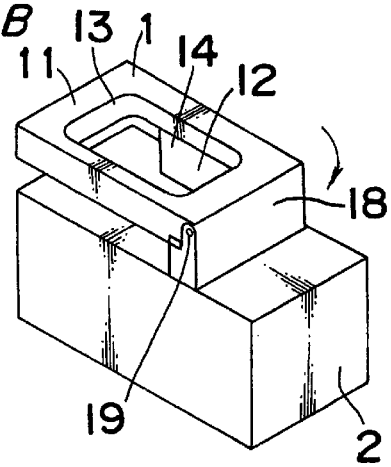
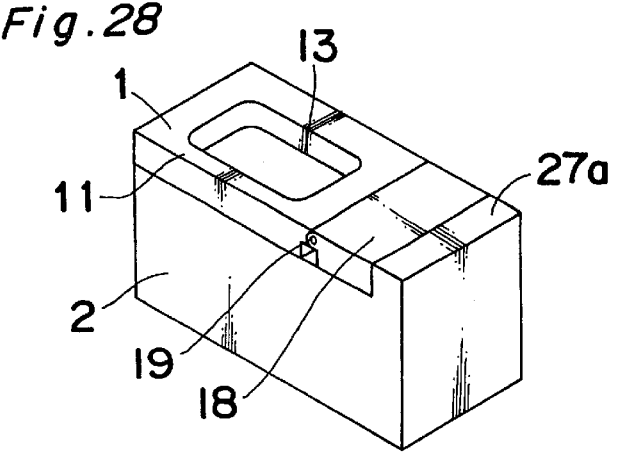

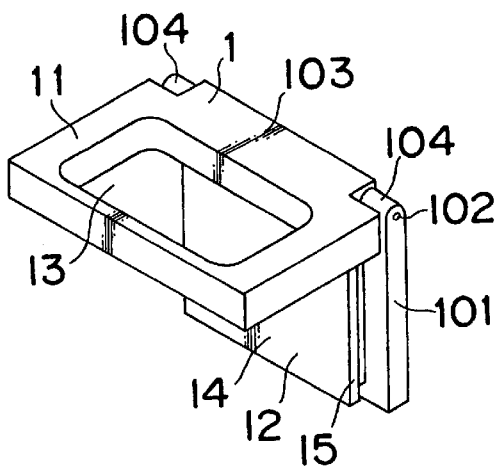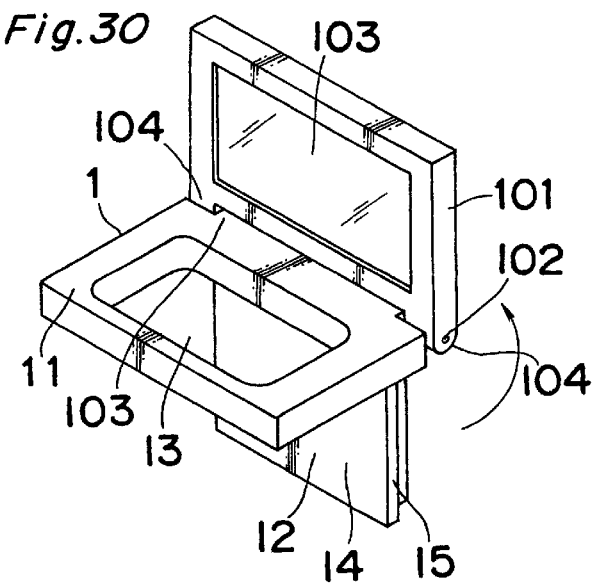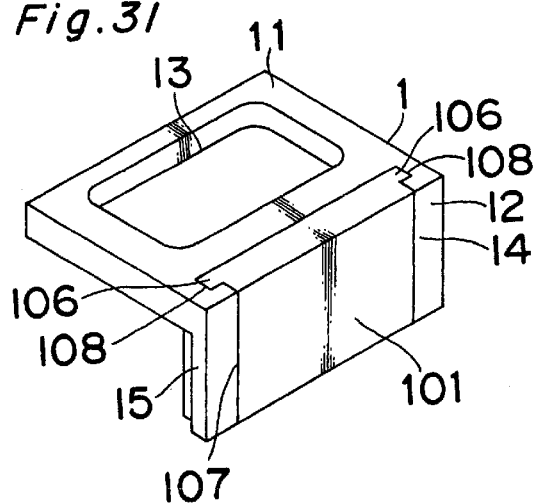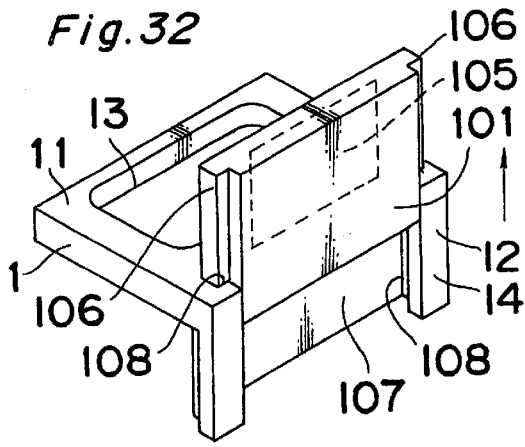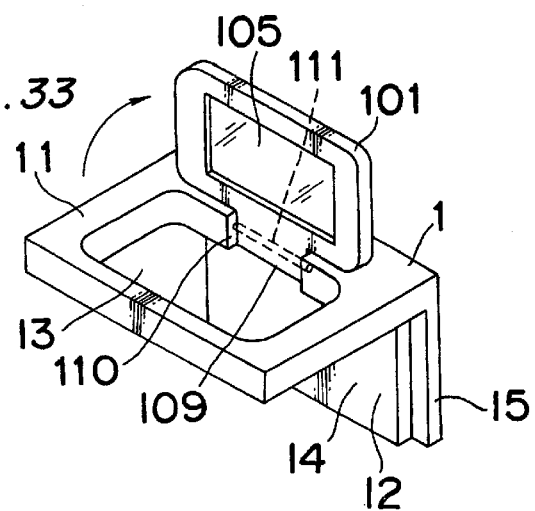

COMBINATION HOLDER AND BATTERY CHARGER

BACKGROUND OF THE INVENTION

1. Field of the Invention

The present invention generally relates to a combination holder and battery charger for a battery operated home appliance such as, for example, a rechargeable electric shaver, a rechargeable hair curler, a rechargeable toothbrush and a battery operated skin cleaner of a kind that requires, or is combined with, a combination holder and battery charger.

2. Description of the Prior Art

The battery operated home appliances of a kind referred to above includes at least one built-in storage battery that requires an occasional charging to electrically recharge it. A battery charger for reenergize the built-in storage battery available either in combination therewith or as an optional item is designed to concurrently serves as a holder for supporting or holding the elongated home appliance while the latter is not in use and/or being recharged.

In recent years, some of the battery operated home appliances are being manufactured with their size reduced, and the combination holder and battery charger for use therewith is correspondingly downsized for convenience of transportation from place to place. When the combination holder and battery charger is made compact and compact, the surface area of the bottom thereof decreases correspondingly. Hence, the smaller the combination holder and battery charger is, the more unstable it is on a supporting surface, for example, a desk top or a shelf when the home appliance is placed thereon. Considering that most of the battery operated home appliances are of a generally elongated configuration, exemplified by, for example, the electric shaver, placement of the electric appliance in an upright position on the combination holder and battery charger makes the assembly top-heavy enough to overturn the assembly.

In order to secure the stability of the combination holder and battery charger, it is necessary to fit a separate support element to the combination holder and battery charger and/or to modify the shape of the bottom of the combination holder and battery charger to increase the surface area thereof. These attempts, however, is in contradiction to downsizing. The use of the separate support element appears not to be wise in that the user would be forced to carry the separate support element together with the assembly with the electric appliance retained in the combination holder and battery charger.

Another problem arising from downsizing of the combination holder and battery charger is found in difficulty in snugly and neatly accommodating an electric wire which extends outwardly from a charger unit built in the combination holder and battery charger for electric connection with a domestic power outlet. As is well known to those skilled in the art, one end of the electric wire remote from the charger unit and, hence, the combination holder and battery charger has a plug secured thereto, which plug has two or three plug pin or blades for insertion into corresponding socket slots of the domestic power outlet. Unless care is taken, the plug pins or blades may give rise to damage to the surface finish of a housing of either the electric appliance or the combination holder and battery charger.

The combination holder and battery charger is known which includes, in addition to the charger unit, a foldable holder slidable relative to a housing between folded and operative positions and a plate fixture for securement of the combination holder and battery charger to a wall surface with the use of fastening elements such as screws or nails. The holder includes an embracing frame which, when, for example, the elongated electric shaver is placed onto the combination holder and battery charger while the holder is in the operative position, embraces the electric shaver to retain it in an upright position to avoid overturn or fall of the electric shaver. On the other hand, when the holder is in the folded position, the combination holder and battery charger represents a generally rectangular box-like configuration, compact in size with no substantial projection which would otherwise represented by the holder in the operative position.

The combination holder and battery charger of a type utilizing the plate fixture requires a mounting structure exposed to the outside of the housing for accommodating the plate fixture and, therefore, lacks a pleasing appearance. By way of example, where the plate fixture prior to being secured to the wall surface is fitted to the housing of the combination holder and battery charger by the use of slide grooves formed in the housing and cooperating slide rails formed in the plate fixture, the slide rails tend to be exposed to the outside of the housing, resulting in degradation of the aesthetic appearance.

Also, when the electric appliance is placed on and held by the combination holder and battery charger, the electric appliances imposes a load on the embracing frame and, therefore, the holder tends to be slid downwardly, failing to hold the electric appliance stably.

SUMMARY OF THE INVENTION

In view of those disadvantages and inconveniences found in the prior art combination holder and battery chargers, the present invention is intended to provide a combination holder and battery charger for a battery operated home appliance which is effective to hold the electric appliance stably with no need to use any separate support element and/or to modify the bottom thereof to increase the surface area.

Another object of the present invention is to provide the combination holder and battery charger of the type discussed above wherein no mounting structure is exposed to the outside and which is effective to hold the electric appliance without allowing the embracing frame to be inadvertently slid downwardly.

In order to accomplish these and other objects and features of the present invention, there is, in accordance with one aspect thereof, provided a combination holder and battery charger for holding a battery operated electric appliance and also for recharging the battery in the electric appliance. The combined holder and charger includes a housing having top and bottom surfaces opposite to each other. A holder is mounted on the housing for sliding movement between a folded position and an operative positions in which the holder holds the electric appliance relative to the housing during recharging of the electric appliance. An auxiliary base stand is operatively disposed on the bottom surface of the housing and capable of assuming one of first and second states. This auxiliary base stand when in the first position has at least a portion thereof protruding laterally outwardly from a contour of the bottom surface of the housing, but that portion of the auxiliary base stand to enable the combination holder and battery charger to be supported stably on a support surface.

Preferably, the auxiliary base stand is pivotally connected to the bottom surface of the housing by means of a bearing boss for pivotal movement between the first and second positions.

The holder preferably includes a holder plate and a slide plate lying perpendicular to the holder plate so that when the holder moves between the folded and operative positions, the slide plate can slide along a surface of the housing lying perpendicular to any one of the top and bottom surfaces thereof. A portion of the auxiliary base stand which aligns with a lower end of the slide plate when the auxiliary base stand is in the second position is preferably depleted to define an access recess.

If a camming rib is mounted on the auxiliary base stand, the holder can be driven at least from the folded position towards the operative position automatically in response to movement of the auxiliary base stand from the second position towards the first position. In place of the camming rib, a geared transmission mechanism may be employed for transmitting movement of the auxiliary base stand between the first and second positions to the holder to thereby drive the holder between the folded and operative positions.

In any event, the auxiliary base stand is preferably made up of a plurality of base plates. Using a gear mechanism such as a pinion-and-rack or a gear train, the base plates may be designed to be driven in unison with each other in a plane parallel to the bottom surface of the housing.

Preferably, the auxiliary base stand is provided with a cable retainer for retaining an electric cable of the electric appliance when the auxiliary base stand is in the second position. This cable retainer may be mounted on the auxiliary base stand for pivotal movement between folded and erected positions, or may include a plurality of retainer segments pivotally connected in series with each other. Also, the cable retainer may provided with a plug constraint for holding a plurality of plug elements of an electric connector plug of the electric appliance.

According to another aspect of the present invention, the combination holder and battery charger may include a wall attachment adapted to allow the combination holder and battery charger to be hung on and supported by a support wall. Where the wall attachment is employed, the auxiliary base stand may be dispensed with if so desired.

Where the wall attachment is employed, this wall attachment plate should be provided with guide rails slidingly engageable in the associated slide groove in the housing that are used to accommodate the holder for movement between the folded and operative positions.

In any event, these and other objects and features of the present invention will become clear from the subsequent description made in connection with some preferred embodiments thereof.

BRIEF DESCRIPTION OF THE DRAWINGS

The present invention will become readily understood from the following description of preferred embodiments thereof made with reference to the accompanying drawings, in which like parts are designated by like reference numeral and which:

FIG. 1 is an exploded view of a combination holder and battery charger according to a first preferred embodiment of the present invention;

FIG. 2 is a fragmentary perspective view of the combination holder and battery charger of FIG. 1 held in an upright position;

FIG. 3 is a perspective view showing an auxiliary base stand employed in the combination holder and battery charger of FIG. 1;

FIG. 4 is a view similar to FIG. 3, showing a second embodiment of the present invention;

FIG. 5 is a schematic perspective view of a bottom portion of the combination holder and battery charger, showing the auxiliary base stand according to a third embodiment of the present invention;

FIG. 6 is a schematic perspective view showing the auxiliary base stand shown in FIG. 5;

FIGS. 7A and 7B are schematic bottom plan view of the combination holder and battery charger showing a base plate held in different operative positions, respectively;

FIGS. 8A and 8B are schematic transverse sectional views of the combination holder and battery charger, showing the base plate held in different operative positions corresponding those shown in FIGS. 7A and 7B, respectively;

FIG. 9 is a schematic transverse sectional view of the combination holder and battery charger according to a fourth embodiment of the present invention;

FIGS. 10A and 10B are schematic perspective views of the combination holder and battery charger according to a fifth embodiment of the present invention, with the auxiliary base stand held in different operative positions, respectively;

FIGS. 11A and 11B are schematic bottom plan views of the combination holder and battery charger according to a sixth embodiment of the present invention, with the auxiliary base stand held in different operative positions, respectively;

FIGS. 12A and 12B are schematic bottom plan views of the combination holder and battery charger according to a seventh embodiment of the present invention, with the auxiliary base stand held in different operative positions, respectively;

FIG. 12C is a schematic cross sectional view taken along the line C—C in FIG. 12B;

FIGS. 13A and 13B are schematic bottom plan views of the combination holder and battery charger according to an eighth embodiment of the present invention;

FIG. 14A is a schematic bottom plan view of the combination holder and battery charger according to a ninth embodiment of the present invention;

FIG. 14B is a schematic cross-sectional view taken along the line d—d in FIG. 14A;

FIGS. 25 and 26 are views similar to FIG. 24, showing the combination holder and battery charger according to a nineteenth embodiment of the present invention, with a holder held in different operative positions, respectively;

FIGS. 27A and 27B are schematic perspective views showing the combination holder and battery charger according to a twentieth embodiment of the present invention, with the holder held in different operative positions, respectively;

FIG. 28 is a schematic perspective view showing the combination holder and battery charger according to a twenty-first embodiment of the present invention;

FIGS. 29 and 30 are schematic perspective views of the holder of the combination holder and battery charger according to a twenty-second embodiment of the present invention, showing the holder in different operative positions, respectively;

FIGS. 31 and 32 are schematic perspective views of the holder of the combination holder and battery charger according to a twenty-third embodiment of the present invention, showing the holder in different operative positions, respectively; and FIG. 33 is a schematic perspective view showing the combination holder and battery charger according to a twenty-fourth embodiment of the present invention.

DESCRIPTION OF THE EMBODIMENTS

Figure 15A:
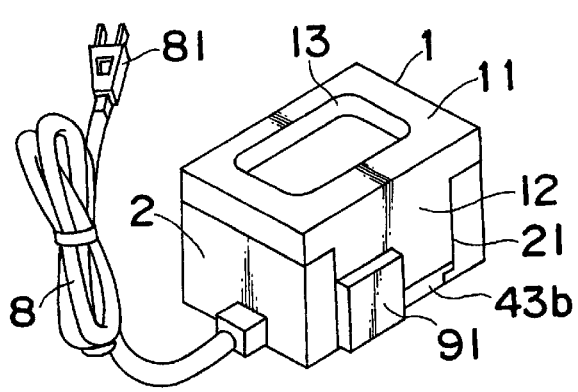
FIGS. 15A and 15B are schematic perspective views of the combination holder and battery charger according to a tenth embodiment of the present invention, showing the auxiliary base stand in different operative positions, respectively.

In describing various preferred embodiments of the present invention, the present invention will be described as applied to a combination holder and battery charger for an electric shaver of a generally elongated configuration. It is, however, to be noted that the present invention is not always limited to application to the electric shaver, but can be equally applied to any electric appliance such as, for example, a rechargeable hair curler, a rechargeable toothbrush and a battery operated skin cleaner or any other appliance of a kind that requires, or is combined with, a combination holder and battery charger.

First Embodiment (FIGS. 1 to 3)

Referring first to FIGS. 1 to 3, there is shown the combination holder and battery charger according to a first embodiment of the present invention. The illustrated combination holder and battery charger includes a generally rectangular box-like housing 2 accommodating fixedly an electric charger unit 23 therein and a holder 1 carried by the housing 2 for movement between folded and operative positions as will be described later. The housing 2 includes a generally rectangular top wall 2a, front and rear walls 2b and 2c and a pair of side walls 2d, all of which may be assembled of one-piece construction by the use of a plastics molding technique so as to open downwardly. The housing 2 also includes a bottom plate 3 used to close the bottom opening of the housing 2 with the charger unit 23 encased therein.

An electric wire having one end provided with any known connector plug 81 has the opposite end electrically connected with the charger unit 23 within the housing 2 and extends outwardly therefrom through an aperture defined in one of the side walls 2c at a location adjacent the bottom opening.

The charging unit 23 may be of any known circuit structure, but in the illustrated embodiment employs any known electromagnetic induction system to recharge one or more storage batteries built in the electric shaver 5. This electromagnetic induction system requires no direct contact between terminal members in the charger unit 23 and counter-terminal members in the electric shaver 5, both of which are completely concealed. Therefore, neither is any terminal member of the charger unit 23 exposed to the outside of the housing 2, nor any counter-terminal member in the electric shaver 5 is exposed to the outside of a housing of the electric shaver 5. Instead, induction coils are used in both the electric shaver 5 and the charger unit 23 so that the storage battery in the electric shaver 5 can be reenergized by the charger unit 23 with the respective induction coils held in the close vicinity of each other while the charger is electrically driven. Since this electromagnetic induction system of the kind referred to above is well known in the art and is currently employed in some of electric home appliances and does not constitute subject matter of the present invention, the details thereof will not be reiterated for the sake of brevity.

The bottom plate 3 is of a shape sufficient to allow it to fit into the bottom opening of the housing 2 with its outer or bottom surface held in flush with a plane of the bottom opening of the housing 2. The bottom plate 3 has a base recess 33 formed therein so as to be recessed a predetermined depth inwardly from the bottom surface thereof, leaving opposite end walls 32 while opening laterally outwardly in opposite directions. The bottom plate 3 also has a bearing boss 31 of a height substantially equal to or slightly smaller than the depth of the base recess 33 and positioned at a geometric center of the shape of the bottom plate 3 so as to protrude outwardly, and includes an auxiliary base stand S accommodated within the base recess 33 as will be described in detail later. This bottom plate 3 may be set in position by means of bonding or by the use of a pawl and slot engagement system with or without at least one fastening element such as a screw with the auxiliary base stand S oriented outwardly. As will become clear from the subsequent description, an inner face of each of the end walls 32 confronting the base recess 33 is inwardly recessed to define a rounded inner face having the center of curvature lying in alignment with a longitudinal axis of the bearing boss 31.

In the embodiment shown in FIGS. 1 to 3, the auxiliary base stand S is in the form of a generally rectangular rotary base plate 4 having a bearing hole 41 defined therein at a location aligned with a geometric center of the shape of the base plate 4 which is, as will become clear from the subsequent description, in alignment with the bearing boss 31 in the bottom plate 3. This base plate 4 is of a thickness substantially equal to the depth of the base recess 33 in the bottom plate 3 and also has its opposite ends rounded so as to occupy diametrically opposite portions of the shape of a circle with its center lying in alignment with the geometric center thereof. This base plate 4 is rotatably accommodated within the base recess 33 in the bottom plate 3 with the bearing boss 31 engaged in the bearing hole 41. It will readily be seen that in an assembled condition with the base plate 4 situated within the base recess 33 as shown in FIG. 3, the base plate 4 is rotatable about the bearing boss 31. Preferably, this base plate 4 has a width equal to the width of the bottom plate 3 and a maximum length slightly smaller than the maximum distance between the rounded inner faces of the end walls 32 passing through the bearing boss 41.

In order to allow the base plate 4 within the base recess 33 to rotate to a position where it lies perpendicular to the bottom plate 3 then set in position within the bottom opening of the housing 2, a bottom edge portions of each of the front and rear walls 2b and 2c is depleted inwardly to define a respective escapement recess 24. This escapement recess 24 is so sized as to accommodate not only the thickness of the base plate 4, but also a free revolution of the base plate 4 about the bearing boss 31.

In the structure described above, respective lower end faces 25 of the opposite side walls 2d of the housing 2, which are in flush with the plane of the bottom opening of the housing 2, and respective end faces of the end walls 32, which are, in a completely assembled condition, held in flush with the lower end faces 25 altogether form a load support that rests on and are held in contact with a support surface such as, for example, a desk top or a dresser shelf to thereby support the entire weight of the electric shave 5 and the charger unit 23.

The housing 2 is provided with generally L-sectioned rail members formed integrally therewith to define mutually confronting slide grooves 7 that extend along opposite ends of the rear wall 2c in a direction perpendicular to a plane of rotation of the base plate 4. A space adjacent an outer surface of the rear wall 2c and bound between the slide grooves 7 defines a slide space 21 as will become clear later.

The holder 1 carried by the housing 2 for movement between folded and operative positions includes a generally rectangular holder plate 11 and a slide plate 12 formed integrally with the holder plate 11 so as to lie perpendicular to the holder plate 11. The holder plate 11 may have a maximum size equal to the size of the top wall 2a and is apertured to define a holder pocket 13 therein. The holder pocket 13 is of a size and shape which are determined by a transverse sectional shape of the electric shaver 5 and is used to support the electric shaver 5, then inserted therethrough with its bottom resting on the top wall 2a, at a level spaced above the top wall 2a of the housing 2 and corresponding to the operative position for the holder 1.

The slide plate 12 includes a plate body 14 of a size corresponding to the size of the slide space 21 and slide rails 15 protruding laterally outwardly from opposite side edges of the plate body 14 and having a sectional configuration matching with the sectional shape of the corresponding slide groove 7 in the housing 2. This slide plate 12 is mounted on the housing 2 with the slide rails 15 slidingly engaged in the slide grooves 7 so that the slide plate 12 and, hence, the holder 1 can move between the folded and operative position in a direction perpendicular to the top wall 2a of the housing 2.

In the structure described above, when the holder 1 is in the folded position, the apertured holder plate 11 is generally held in contact with the top wall 2a of the housing 2 while the plate body 11 of the slide plate 12 is accommodated within the slide space 21. However, when the holder 1 is moved to the operative position, only an upper portion of the plate body 14 protrudes outwardly from the housing 2 while the apertured holder plate 11 is spaced a distance above the top wall 2a of the housing 2 as shown in FIGS. 2 and 4.

When the combination holder and battery charger is in use for recharging the storage battery in the electric shaver 5, the user has to slide the holder 1 relative to the housing 2 to bring it to the operative position and then to mount the electric holder on the housing 2 through the holder pocket 13. At this time, the electric shaver 5 stands above the top wall 2a of the housing 2 with an intermediate portion thereof extending through the holder pocket 13 as shown in FIG. 2. Prior to the mounting of the electric shaver 5, however, the user has to turn the base plate 4 about the bearing boss 31 so as to lie at right angles to the bottom plate 3 and then places the combination holder and battery charger on the support surface (not shown).

The slide rails 15 are preferably slightly oversized relative to the size of the slide grooves 7 so that the slide rails 15 can be inserted in the respective slide grooves 7 under interference fit, wherefore, the holder 1 slid to the operative position can be retained in the operative position stably by the effect of a friction developed between outer surfaces of the slide rails 15 and inner surfaces of the slide grooves 7, with the apertured holder plate 11 snugly holding the electric shaver 5. Although at this time the assembly including the combination holder and battery charger and the electric shaver 5 mounted thereon has its center of gravity positioned at a high level above the holder 1, the assembly can be stably supported by the load support and the base plate 4 then lying perpendicular to the bottom plate 3, both of which are then held in contact with the support surface, and accordingly the assembly as a whole can be supported in an upright position stably.

When the combination holder and battery charger is not in use, the holder 2 is held at the folded position with the apertured holder plate 11 held in abutment with the top wall 2a of the housing 2 and the base plate 4 is held in position to lie parallel to the bottom plate having been snugly accommodated within the base recess 33 as shown in FIG. 3. Thus, it will readily be seen that the combination holder and charged when not in use is compact in size and convenient for transportation from place to place. At the same time, the slide space 21 is completely filled up by the plate body 14 of the slide plate 12 with the slide rails 15 completely concealing the respective slide grooves 7 as shown in FIG. 3, rendering the combination holder and battery charger as a whole to be pleasant to look at. It is particularly to be noted that the slide plate 12 may have a length, as measured in a direction conforming to the direction of slide of the slide plate 12, which may be so selected that when the holder 1 is in the folded position as shown in FIG. 3 one of the escapement recesses 24 that is defined in the rear wall 2c can be closed by a lower end of the slide plate 12 as shown in FIG. 3 to thereby prevent the base plate 4 from being arbitrarily rotated about the bearing boss 31 and also to provide a sophisticated outer appearance.

If desired, the foregoing embodiment of the combination holder and battery charger may include a wall attachment 6 which will be described in detail later and which can be used when the combination holder and battery charger is desired to be fitted to an upright wall surface or a wall-hung cabinet. Briefly speaking, the wall attachment 6 shown therein is of a shape substantially similar to the slide plate 12, but has a size smaller than the length of the slide plate 12. However, in the practice of the embodiment shown in FIGS. 1 to 3, the use of the wall attachment 6 is not essential.

Second Embodiment (FIG. 4)

In an embodiment shown in FIG. 4, the housing 2 has its bottom formed with a bottom plate chamber 26 in the form of a cavity opening downwardly of the housing 2 and also laterally outwardly in a direction perpendicular to the longitudinal sense of the bottom of the housing 2, and the bearing boss 31 is formed at a geometric center of the shape of the bottom plate chamber 26 so as to protrude downwardly. One of opposite sides of the bottom plate chamber 26 is formed so as to communicate with a lower end of the slide space 21. The load support 27 in the embodiment shown in FIG. 4 for supporting the housing 2 is defined at the bottom of the housing 2 at a location adjacent each of the opposite side walls 2d so as to protrude downwardly from a level flush with an upper bottom surface of the bottom plate chamber 26, and has an inner face inwardly recessed to define a rounded inner face having the center of curvature lying in alignment with a longitudinal axis of the bearing boss 31.

The base plate 4 rotatable about the bearing boss 31 is of a shape similar to the shape of the bottom plate chamber 26, having a length slightly smaller than the maximum distance between the rounded inner faces of the load supports 27 and a width generally equal to the width of the bottom plate 3. At a position immediately below the lower end of the slide plate 12, one of opposite sides of the base plate 4 is formed with an access recess 42 extending inwardly thereof so that when the holder 1 is held at the folded position, that lower end of the slide plate 12 can be exposed to the outside through the access recess 42. Since the lower end of the slide plate 12 is exposed to the outside through the access recess 42 as described above, a finger pressure necessary to push the slide plate 12 to bring the holder 1 towards the operative position can easily be applied to the slide plate 12 through the access recess 42.

An idea similar to that envisioned in this second embodiment of FIG. 4 may be equally applied to the first embodiment of FIGS. 1 to 3 so that not only can the folded position for the holder 1 be defined by that side edge of the base plate 4, but also the user's finger can make access to the lower end of the slide plate 12 from below through a similar access recess defined in an intermediate portion of that side edge of the base plate 4.

Third Embodiment (FIGS. 5 to 8A)

In an embodiment shown in FIGS. 5 to 8B, and referring particularly to FIG. 5, the top wall 2a of the housing 2 is partly stepped down to define a storage space 22 of a size sufficient to accommodate the apertured holder plate 11 therein. Specifically, when the holder 1 is in the folded position, the apertured holder plate 11 is nested within the storage space 22 with its top surface held in flush with a top surface of the top wall 2a of the housing 2. Also, as shown in FIG. 6, the bottom plate 3 in this embodiment is formed integrally with the housing 2.

The combination holder and battery charger may additionally include a linkage means is provided for drivingly linking the holder 1 and the base plate 4 together such that as the base plate 4 is turned about the bearing boss 31 the holder 1 can be moved with the slide plate 12 guided by the slide grooves 7. In the embodiment shown in FIGS. 5 to 8B, the linkage means includes a camming rib 43 provided on an upper surface of the base plate 4 at a location offset from the bearing hole 41. This camming rib 43 has a cam top 45 and a cam slope 44 continued from the cam top 45 and inclined downwardly therefrom towards the upper surface of the base plate 4 as best shown in FIGS. 8A and 8B.

The camming rib 43 is so positioned that a lower end face of the slide plate 12 can rest on the upper surface of the base plate 4 when and so long as the holder 1 is held in the folded position as shown in FIG. 8A,, but can slidingly ride over the cam slope 44 as the base plate 4 is turned about the bearing boss 31 in a direction, for example, clockwise as viewed in FIGS. 7A and 7B and subsequently rest on the cam top 45 when the holder 1 arrives at the operative position as shown in FIG. 8B. As a matter of design, with the holder 1 held at the operative position, the base plate 4 lies at right angles to the longitudinal sense of the bottom plate 3 with its opposite end portions laterally outwardly exposed from the front and rear walls 2b and 2c of the housing 2.

Turns of the base plate about the bearing boss 31 in a direction counter to that described above, that is, counter-clockwise as viewed in FIGS. 7A and 7B allows the slide plate 12 to be lowered in dependence on the position of the camming rib 43. Thus, it will readily be seen that turn of the base plate 4 between protruding and retracted positions about the bearing boss 31 results in movement of the holder 1 between the operative and folded positions. Accordingly, it is not necessary for the user to manipulate both of the holder 1 and the base plate 4, but to simply turn the base plate 4.

Fourth Embodiment (FIG. 9)

In an embodiment shown in FIG. 9, the linkage means referred to hereinbefore includes a geared motion translator made up of a crown gear 19 rotatable in a plane parallel to the bottom plate 3, a sprocket wheel 22 rotatable in a plane perpendicular to the bottom plate 3 and meshed with the crown gear 19 and a rack 12 formed on an inner surface of the slide plate 12 and meshed with the sprocket wheel 22. In view of the use of the geared motion translator, the bearing boss 31 is superseded by a stud shaft 40 having one end integral with the base plate 4 and the opposite end coupled coaxially with the crown gear 19 within the housing 2, a generally intermediate portion of said stud shaft 40 extending rotatably through a bearing hole 34 defined in the bottom plate 3. Accordingly, turn of the base plate 4 is accompanied by simultaneous rotation of the crown gear 19.

The sprocket wheel 22 meshed with the rack 16 on one hand and with the crown gear 19 on the other hand is supported within the housing 2 by means of an axis extending widthwise of the housing 2 or in a direction parallel to the longitudinal axis of the bottom plate 3. Accordingly, it will readily be seen that as the base plate 4 is turned about the bearing hole 34 from the retracted position towards the projecting position, the crown gear 19 rotatable together with the base plate 4 causes the sprocket wheel 22 to rotate about the axis thereof, which in turn drives the rack 16 and, hence, the slide plate 12 to move the holder 1 from the folded position towards the operative position.

Thus, as is the case with the embodiment shown in FIGS. 5 to 8A, it is not necessary for the user to manipulate both of the holder 1 and the base plate 4, but to simply turn the base plate 4.

Fifth Embodiment (FIGS. 10A and 10B)

In this embodiment, the auxiliary base stand S includes generally rectangular slide bases 43a and 43a of a substantially equal size. To accommodate the slide bases 43a and 43c in a manner as will be described later, the bottom of the housing 2 is provided with generally L-sectioned rail members formed integrally therewith to define mutually confronting bottom slide grooves 35 that extend along opposite ends of the bottom plate 3 in a direction perpendicular to a plane of movement of the slide plate 12. A space adjacent an outer bottom surface of the bottom plate 3 and bound between the bottom slide grooves 35 defines the base space 33 in which the slide plates 43a and 43b are slidably accommodated in side-by-side fashion with each other.

Specifically, the slide bases 43a and 43b are relatively slidably connected together by means of a slide groove 45 and a slide rail 44 that are defined in mating side edges thereof. In the illustrated embodiment, the slide groove 45 is shown as formed in the side edge of the slide base 43a whereas the slide rail 44 is defined in the side edge of the slide base 43b. The opposite side edge of each of the slide bases 43a and 43b is formed with a slide rail 43a or 44a which is slidably engaged in the respective bottom slide groove 35.

The auxiliary base stand S employed in the embodiment shown in FIGS. 10A and 10B is so designed and so configured that respective bottom surfaces of the slide bases 43a and 43b are in flush with each other and also with the end faces of the end walls 32, to thereby define the load support that rests on and are held in contact with the support surface and that the slide bases 43a and 43b can be slidable between projecting and retracted positions in a direction widthwise of the bottom plate 3 of the housing 2. Thus, when the combination holder and battery charger is not in use, the combination holder and battery charger represents such a shape as shown in FIG. 10A having a substantially flat bottom with the slide bases 43a and 43b held in the retracted position, whereas when it is in use the slide bases 43a and 43b are slid to the projected positions with respective parts thereof protruding laterally outwardly. In practice, the slide bases 43a and 43b are, when the combination holder and battery charger is in use, slide to the projected position in respective directions opposite to each other as shown in FIG. 10B so that the assembly including the combination holder and battery charger with the electric shaver mounted thereon can be supported on the support surface stably.

In any event, even the combination holder and battery charger according to the embodiment shown in FIGS. 10A and 10B can function in a manner substantially similar to that according to any one of the foregoing embodiments, with similar meritorious effects brought about thereby.

Sixth Embodiment (FIGS. 11A and 11B)

In an embodiment shown in FIGS. 11A and 11B, the auxiliary support stand S includes two slide bases 43x and 43y supported and slidable within the base recess 33 in a manner similar to the slide bases 43a and 43b employed in the previously described embodiment. However, the slide bases 43x and 43y are relatively movably coupled together not by a rail-and-groove engagement system such as employed in the previously described embodiment, but by a rack-and-pinion system which will now be described.

A portion of the length of one of the opposite side edges of the slide base 43x which confronts the slide base 43y is formed with a rack 46a and, on the other hand, a portion of the length of one of the opposite side edges of the slide base 43y which confronts the slide base 43x is similarly formed with a rack 46b. A pinion gear 36 rotatably connected to the bottom plate 3 by means of a stud shaft at a location aligned with a geometric center of the shape of the bottom plate 3 intervenes between the slide bases 43x and 43y and are meshed with the racks 46a and 46b. The racks 46a and 46b formed in the respective slide bases 43x and 43y extend respective directions counter to each other with respect to the pinion gear 36 and are positioned symmetrical with respect to the pinion gear 36 such that slide of one of the slide bases 43x and 43y in one direction results in slide of the other of the slide bases 43x and 43y in a direction counter to the direction of movement of such one of the slide bases 43x and 43y as best shown in FIG. 11B.

Except that the slide bases 43x and 43y are so drivingly coupled with each other by means of the rack-and-pinion system making it possible for the user to apply a pushing force only to one of the slide bases 43x and 43y to move the latter towards the projecting position in respective directions opposite to each other, the combination holder and battery charger according to the embodiment of FIGS. 11A and 11B functions in a manner similar to, and brings about effects similar to that shown in FIGS. 10A and 10B.

Seventh Embodiment (FIGS. 12A to 12C)

The auxiliary support stand S employed in this embodiment includes two rotary bases 38a and 38b operatively accommodated within the base recess 33 in the bottom plate 3 for rotation between retracted and projecting positions about respective pivot pins 37a and 37b. Each of the rotary bases 38a and 38b is generally sector-shaped having a generally right-angled corner where a bearing hole 41 is formed. The pivot pins 37a and 37b rotatably extends through the associated bearing holes 41 in the rotary bases 38a and 38b and are then tapped into bearing recesses 38 as shown in FIG. 12C. It is to be noted that respective axes of rotation of the generally sector-shaped rotary bases 38a and 38b which are in alignment with the pivot pins 37a and 37b are positioned on respective sides with respect to the longitudinal axis of the bottom plate 3 and also on respective sides of a mid-center line drawn perpendicular to the longitudinal axis of the bottom plate 3 and extending widthwise of the bottom plate 3, and are symmetrical with each other with respect to a geometric center of the shape of the bottom plate 3.

As a matter of design, the center of curvature of each of the generally sector-shaped rotary bases 38a and 38b lies in alignment with the respective pivot pin 37a or 37b and, accordingly, as viewed in FIGS. 12A and 12B, the rotary base 38a, when moved towards the projecting position, protrudes laterally outwardly from the housing 2 in one direction whereas the rotary base 38b when moved towards the projected position protrudes laterally outwardly from the housing 2 in a direction counter to such one direction. During rotation of the rotary bases 38a and 38b in the respective directions, the both will interfere neither with each other nor with the end walls 32 and, therefore, such rotation takes place smoothly.

Eighth Embodiment (FIGS. 13A and 13B)

The auxiliary support stand S employed in this embodiment shown in FIGS. 13A and 13B includes two pairs of generally rectangular rotary bases 4w to 4z of an equal size, each pair positioned adjacent the respective end wall 32 of the bottom plate 3. The rotary bases 4w to 4z are pivotally mounted on respective bearing pins 37w to 37z which are positioned so as to occupy four corners of the shape of a square, in a symmetrical relation with respect to and adjacent the geometric center of the bottom plate 3. Opposite ends of each of the rotary bases 4w to 4z are rounded with its center of curvature aligned with the associated bearing pin 37w to 37z, but the radius of curvature of one of those opposite ends adjacent the end wall 32 is greater than that of the other of those opposite ends such that turn of those rotary bases 4w to 4z about the associated bearing pins 37w to 37z will not interfere with each other.

The rotary bases 34w to 34z are so sized that in a condition in which they are held at the retracted position and are neatly accommodated within the base recess 33 as shown in FIG. 13A, the rotary bases 34w, 34x or 34y, 34z of each pair can be disposed in side-by-side fashion relative to each other with their longitudinal axes lying parallel to the longitudinal axis of the bottom plate 3 without laterally protruding outwardly from the housing. However, when in use, they should be turned about the associated bearing pins 37w to 37z to assume the protruding position in which the rotary bases 34w, 34x or 34y, 34z of each pair can protrude laterally outwardly from the housing in respective directions opposite to each other and parallel with the next adjacent rotary bases 34w, 34x or 34y, 34z of the other pair as shown in FIG. 13B.

Ninth Embodiment (FIGS. 14A and 14B)

The auxiliary support stand S employed in this embodiment shown in FIGS. 14A and 14B is substantially similar to that shown in FIGS. 12A to 12C, but differs therefrom in that in this embodiment the linkage means is employed for drivingly linking the rotary bases 38a and 38b together such that turn of one of the rotary bases 38a and 38b in one direction results in synchronized turn of the other of the rotary bases 38a and 38b in a direction opposite to such direction.

As clearly shown in FIG. 14B, the rotary bases 38a and 38b have acute angled corners positioned at respective locations laterally offset from the geometric center of the shape of the bottom plate 3 where an intermediate gear 39 is rotatably mounted. This intermediate gear 39 is meshed with two gears 47a and 47b positioned on respective sides thereof and rotatable together with the associated rotary bases 38a and 38b. The rotary bases 38a and 38b together with the associated gears 47a and 47b are accommodated within the base recess 33 and rotatably supported by pivot pins 37a and 37b each having its opposite ends inserted into the acute angled corner of the rotary base 38a or 38b and the bottom plate 3.

Respective axes of rotation of the sector-shaped rotary bases 38a and 38b, which are defined by the pivot pins 37a and 37b, relative to the axis of rotation of the intermediate gear 39 are so positioned that when the rotary bases 38a and 38b are in the retracted position as shown in FIG. 14A, the both can be neatly accommodated within the base recess 33 without protruding laterally outwardly therefrom, but when they are turned to the projecting position in unison with each other, the rotary bases 38a and 38b protrude laterally outwardly from the base recess 33 in respective directions opposite to each other in a manner substantially similar to FIG. 12B.

Figure 15B:
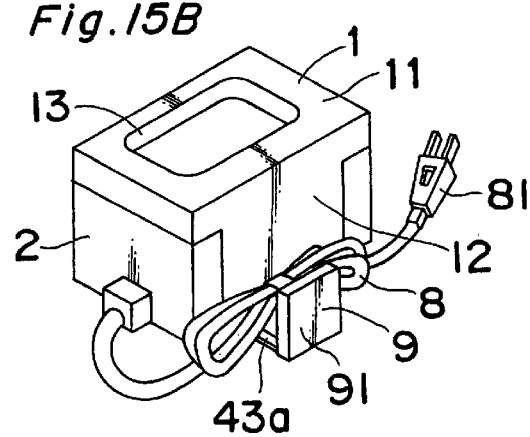

Tenth Embodiment (FIGS. 15A and 15B)

While any of the foregoing embodiments has been directed primarily to the auxiliary support stand S, an embodiment shown in FIGS. 15A and 15B, as well as embodiments shown respectively in FIGS. 16A and 16B, FIGS. 17A and 17B and FIG. 18, is directed to an electric wire retainer and is applicable to the combination holder and battery charger of the structure wherein the auxiliary support stand S is comprised of the slide bases such as shown in FIGS. 10A and 10B and FIGS. 11A and 11B. For the purpose of description, the embodiment shown in FIGS. 15A and 15B will be described as applied to the combination holder and battery charger of the structure shown in FIGS. 10A and 10B.

Referring to FIGS. 10A and 10B in combination with FIGS. 15A and 15B, one of the slide bases, for example, the slide base 43a is formed integrally with an upright retainer 91 lying perpendicular to the slide base 43a so as to protrude upwardly along an outer surface of the slide plate 12 of the holder 1. When and so long as the slide base 43a is in the retracted position as shown in FIGS. 10A and 15A, the upright retainer 91 is held in contact with the outer surface of the slide plate 12, but when the slide base 43a is slid to the projecting position as shown in FIGS. 10B and 15B, the upright retainer 91 is spaced apart from the outer surface of the slide plate 12 to define a wire retainer unit 9 for accommodating a bundle of folded turns of the electric wire 8 in a manner as shown in FIG. 15B.

The bundle of folded turns of the electric wire 8 may be encircled by a hook, circlip or elastic band so that the folded turns of the electric wire 8 can be snugly and neatly accommodated within the wire retainer unit 9 during transportation of the combination holder and battery charger without giving rise to damage to the outer finish of the housing 2.

Figure 16A:
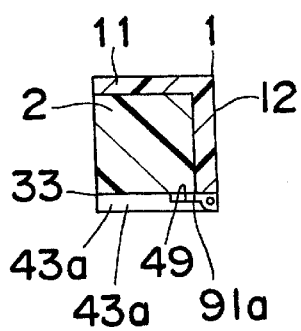
FIGS. 16A and 16B are schematic side sectional views of the combination holder and battery charger according to an eleventh embodiment of the present invention, showing the auxiliary base stand in different operative positions, respectively.
Figure 16B:
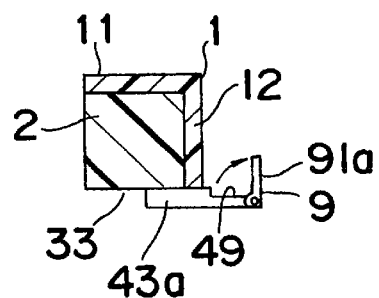

Eleventh Embodiment (FIGS. 16A and 16B)

An embodiment shown in FIGS. 16A and 16B may be a modification of the previously described embodiment of FIGS. 15A and 15B. While in the embodiment of FIGS. 15A and 15B the upright retainer 91 has been shown as formed integrally with the slide base 43a, a retainer 91a functionally similar to the upright retainer 91a is supported by the slide base 43a for pivotal movement between a folded position as shown in FIG. 16A and an erected position as shown in FIG. 16B about a pivot shaft. An end portion of an upper surface of the slide base 43a adjacent the pivotable retainer 91a is inwardly recessed to depleted a recess 49 of a depth substantially equal to the thickness of the pivotable retainer 91a so that when the latter is in the folded position, the pivotable plate 91a can be completely accommodated therein without disturbing a free slide movement of the slide base 43a between the protruding position and the retracted position. As a matter of course, when while the slide base 43a is in the protruding position, the pivotable retainer 91a is pivoted from the folded position to the erected position, the wire retainer unit 9 is defined between the outer surface of the slide plate 12 and the pivotable retainer 91a in a manner similar to that shown in FIG. 15B.

Figure 17A:
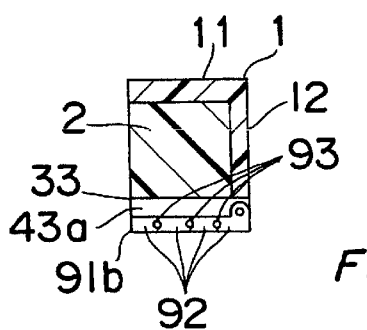
FIGS. 17A and 17B are schematic side sectional views of the combination holder and battery charger according to a twelfth embodiment of the present invention, showing the auxiliary base stand in different operative positions, respectively.
Figure 17B:
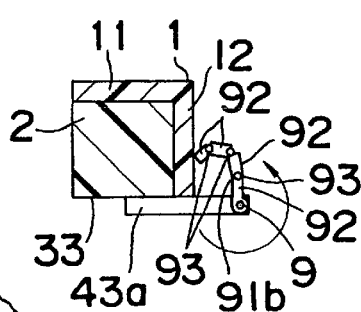

Twelfth Embodiment (FIGS. 17A and 17B)

An embodiment shown in FIGS. 17A and 17B may also be another modification of the previously described embodiment of FIGS. 15A and 15B, but is rather similar to the embodiment shown in FIGS. 16A and 16B. A wire retainer 9b shown therein is comprised of a plurality of retainer segments 92 connected in series with each other by means of pins 93 in a manner generally similar to a roller chain. This wire retainer 9b is carried by the slide base 43a for pivotal movement between a retracted position, in which as shown in FIG. 17A, the wire retainer 9 lies flat against an undersurface of the slide base 43a, and a holding position in which as shown in FIG. 17B the wire retainer 9b has been pivoted in a direction shown by the arrow so as to extend upwardly along the slide plate 12.

The wire retainer 91b when in the retracted position as shown in FIG. 17A, the wire retainer 9 is held flat against the undersurface of the slide base 43a without providing any projection from the housing 2. However, when in the holding position as shown in FIG. 17B, the wire retainer 91b having been pivoted in the direction shown by the arrow in FIG. 17B can be curved to grip the folded turns of the electric wire 8 to enclose the folded turns of the electric wire 8 within the retainer unit 9. Accordingly, as compared with the embodiments shown respectively in FIGS. 15A and 15B and FIGS. 16A and 16B, the electric wire 8 can be firmly retained.

Figure 18:
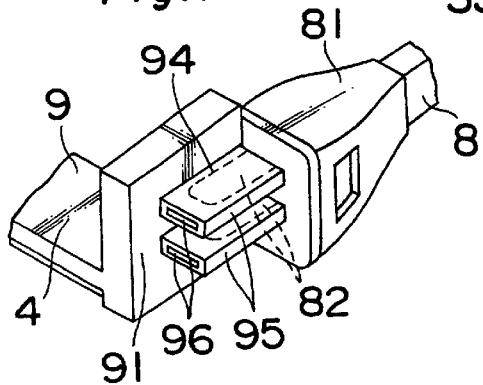
FIG. 18 is a schematic perspective view showing a portion of the auxiliary base stand according to a thirteenth embodiment of the present invention.

Thirteenth Embodiment (FIG. 18)

This embodiment shown in FIG. 18 is applicable particularly to the embodiment shown in FIGS. 15A and 15B. In this embodiment, in order to prevent the connector plug 81 of the electric wire from arbitrarily moving, for example, even though the folded turns of the electric wire 8 have been retained in the retainer unit 9 defined between the upright retainer 91 and the slide plate 12, an outer surface of the upright retainer 91 formed with a plug constraint 94 made up of a pair of plug sheaths 95. Since the connector plug 81 shown in FIG. 18 is of a type having a pair of plug blades 82, the plug sheaths 95 has correspondingly shaped sockets 96 defined therein for receiving and retaining the plug blades 82. As a matter of course, where the plug 81 is of a type having plug pins, the plug sheaths have to be formed with round holes corresponding in shape to the plug pins. Although the pair of the plug sheaths 95 may be oriented in any desired direction, it is preferable that the pair of the plug sheaths 95 are oriented horizontally.

Figure 19:
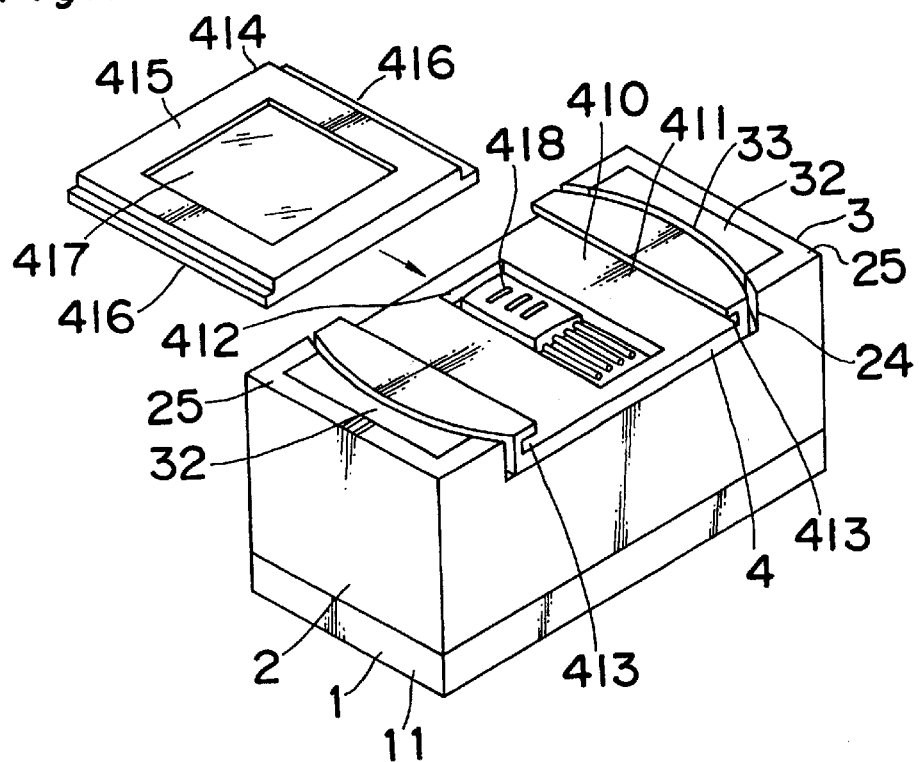
FIG. 19 is a schematic perspective view showing a bottom portion of the combination holder and battery charger according to a fourteenth embodiment of the present invention.

Fourteenth Embodiment (FIG. 19)

An embodiment shown in FIG. 19 is applicable particularly to the combination holder and battery charger of the structure according to any one of the embodiments shown respectively in FIGS. 1 to 3, FIG. 4, FIGS. 5 to 8 and FIG. 9. The embodiment shown in FIG. 19 is featured in that means 410 for accommodating accessory parts of the electric appliance is formed in the base plate 4. For example, where the electric appliance is an electric shaver such as in the illustrated embodiments, a shaver brush and a compact mirror can be accommodated in the rotary base plate 4. For the purpose of this embodiment, however, the rotary base plate 4 has a substantial thickness as compared with that in any one of the embodiments shown respectively in FIGS. 1 to 3, FIG. 4, FIGS. 5 to 8 and FIG. 9 and, correspondingly, the base recess 33 defined in the bottom plate 3 has a corresponding depth sufficient to accommodate the base plate 4.

The rotary base plate 4 has a generally rectangular cavity 411 defined therein so as to be depressed inwardly from the bottom surface thereof and open laterally outwardly in respective directions opposite to each other and transverse to the longitudinal sense of the base plate 4, leaving side walls adjacent the respective ends thereof. The side walls are formed with respective guide grooves 413 defined therein so as to extend parallel to each other in a direction transverse to the longitudinal sense of the base plate 4 and communicated with the cavity 411.

A generally center area of the rotary base plate 4 is formed with a brush chamber 412 for accommodating a shaver brush 418 therein.

The rotary base plate 4 includes a generally rectangular slide lid 414 having its opposite side edge formed with respective guide rails 416 protruding laterally outwardly therefrom in respective directions opposite to each other. This rectangular slide lid 414 has a transverse sectional shape conforming to the cross section of the cavity 411 taken along the line parallel to the longitudinal sense of the base plate 4 and, accordingly, the slide lid 414 can be inserted into the cavity 411 with the guide rails 416 slidingly engaged in the guide grooves 413 to thereby fill up the cavity 411 with the brush chamber 412 consequently closed thereby.

One of opposite surfaces of the slide lid 414 which faces outwards and, hence, serves as a bottom of the assembly is provided with a mirror 417 which can be utilized by the user during shaving.

Thus, according to the embodiment shown in FIG. 19, shaving utensils such as the mirror 417 and the brush 418 can be conveniently contained in the combination holder and battery charger without interfering the functionality of the rotary base plate 3.

Figure 20:
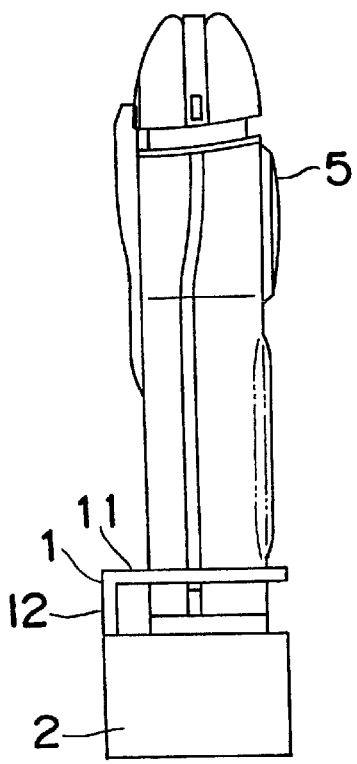
FIG. 20 is a schematic side view of the combination holder and battery charger with an electric shaver mounted thereon according to a fifteenth embodiment of the present invention.
Figure 21:
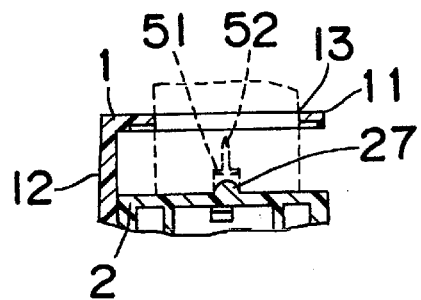
FIG. 21 is a fragmentary longitudinal sectional view showing an upper portion of the combination holder and battery charger shown in FIG. 20.

Fifteenth Embodiment (FIGS. 20 and 21)

An embodiment shown in FIGS. 20 and 21 is applicable to any one of the foregoing embodiments as well as any one of subsequently described embodiments of the present invention and is featured in that the outer surface of the top wall 2a of the housing 2 is formed with a projection 27 that can engage in a recess 51 formed in a bottom end of the electric shaver 5. The recess 51 defined in the bottom end of the electric shaver 5 so as to open downwardly is in the form of a boss hole for concealing a fastening element 52 such as a screw and, accordingly, the projection 27 integral or rigid with the top wall 2a of the housing 2 is so positioned and so configured as to engage in the recess 51 when the holder 2 is moved to the operative position and the electric shaver 5 is mounted on the combination holder and battery charger so that the electric shaver 5 can be securely supported in the upright positions without allowing the bottom portion thereof being displaced sideways. Preferably, the projection 27 has a diameter generally equal or slightly smaller than the inner diameter of the recess 51 and a length generally equal to or slightly smaller than the depth of the recess 51.

Figure 22A:
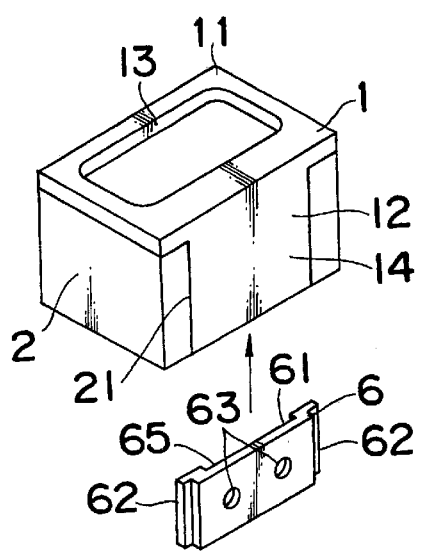
FIGS. 22A and 22B are schematic perspective views of the combination holder and battery charger according to a sixteenth embodiment of the present invention, showing a wall attachment held in different operative positions, respectively.
Figure 22B:
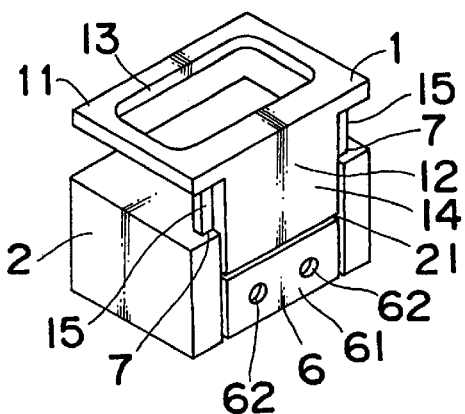

Sixteenth Embodiment (FIGS. 1, 22A and 22B)

This embodiment particularly shown in FIGS. 22A and 22B requires the use of the wall attachment 6 briefly discussed in connection with the embodiment shown in FIGS. 1 to 3 for allowing the combination holder and battery charger to be fitted to an upright wall surface or a wall-hung cabinet. As previously described, speaking, the wall attachment 6 shown therein is of a shape substantially similar to the slide plate 12, but has a size smaller than the length of the slide plate 12. This wall attachment 6 includes a generally rectangular plate body 61 having a thickness preferably equal to that of the slide plate 12 and also having its opposite side edges formed with guide rails 62 slidingly engageable in the housing 2 along with the slide plate 12 of the holder 2. One of the opposite surfaces of the plate body 61 adapted to face towards the rear wall 2c of the housing 2 is inwardly recessed to define an inner recess 51. The plate body 61 is formed with two fitting holes through which set screws 64 (FIG. 1) are passed to secure the wall attachment 6 to the support wall so that the combination holder and battery charger can be hung thereon.

As is the case with the slide rails 15 in the slide plate 12, the guide rails 62 are preferably slightly oversized relative to the size of the slide grooves 7 so that the guide rails 62 can be inserted in the respective slide grooves 7 under interference fit, so that the combination holder and battery charger can, when hung onto the wall attachment 6 in the manner described above, will not fall downwards.

When the combination holder and battery charger is to be hung on the wall attachment 6 then secured to the support wall, the combination holder and battery charger has to be mounted onto the wall attachment from above so that the guide rails 62 integral with the plate body 61 can be guided in and slide along the slide grooves 7 from below relative to the housing 2. As the plate body 61 is inserted in the slide space 21, an upper edge of the plate body 61 pushed the slide plate 12 upwardly, allowing the holder 2 to shift from the folded position towards the operative position as shown in FIG. 22B.

Pull of the housing 2 upwardly relative to the wall attachment 6, leaving the wall attachment 6 therebelow results in separation of the combination holder and battery charger from the wall attachment 6.

In the embodiment shown in FIGS. 22A and 22B, the slide grooves 7 defined in the housing 2 are concurrently used for guiding and accommodating the wall attachment 6 as hereinabove described, but the slide grooves 7 are filled up by the slide plate 12 when the combination holder and battery charger is not hung on the wall attachment 6, thereby providing an appealing appearance.

Figure 23A:
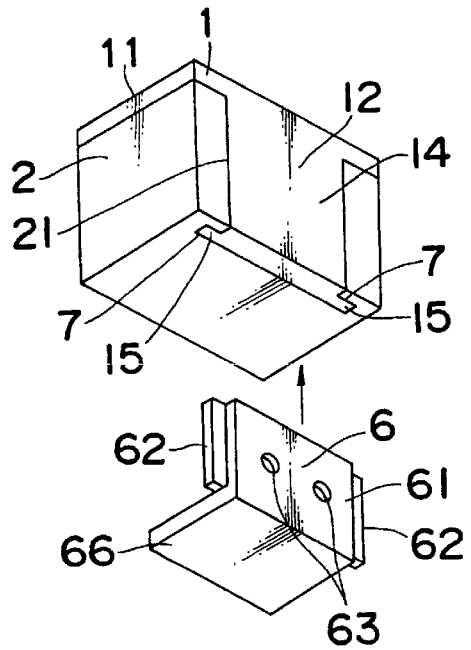
FIGS. 23A and 23B are schematic perspective views, as viewed from below, of the combination holder and battery charger according to a seventh embodiment of the present invention, showing the wall attachment held in different operative positions, respectively.
Figure 23B:
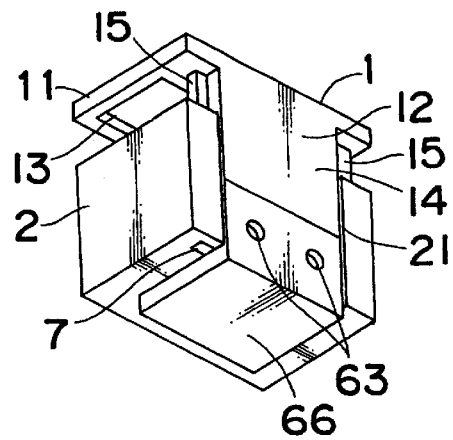

Seventeenth Embodiment (FIGS. 23A and 23B)

An embodiment shown in FIGS. 23A and 23B may be a modification of the previously described embodiment.

According to this embodiment, the wall attachment 6 includes a generally rectangular base support 66 formed integrally with a lower edge of the plate body 61 so as to lie perpendicular to the plate body 61. The base support 66 is, when the combination holder and battery charger is mounted on the wall attachment 6 in the manner shown in FIG. 23B, brought into contact with the bottom of the housing 2 which is represented by the bottom plate 3 and the base plate 4 although the plates 3 and 4 are not shown in FIGS. 23A and 23B for the sake of brevity.

The base support 66 serves not only to define the extent to which the wall attachment 6 is slide into the slide space 21 relative to the housing 2, but also to support the housing 2 from below when the combination holder and battery charger is mounted on the wall attachment 6 then secured to the support wall.

Figure 24:
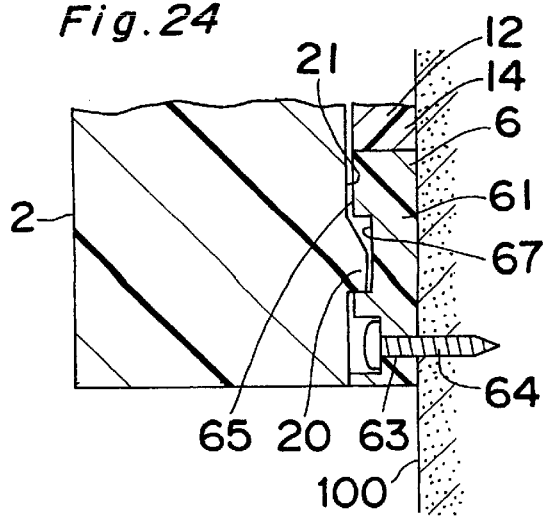
FIG. 24 is a fragmentary side sectional view of a portion of the combination holder and battery charger according to an eighteenth embodiment of the present invention.

Eighteenth Embodiment (FIG. 24)

In this embodiment shown in FIG. 14, a detent mechanism made up of an engagement projection and an engagement recess for receiving the engagement projection is employed. More specifically, an outer surface of the rear wall 2c (FIG. 1) confronting the slide space 21 is formed with an engagement projection 20 on one hand and a mating engagement recess 67 is formed on an outer surface of the plate body 61 of the wall attachment 6 so that when the combination holder and battery charger is mounted on the wall attachment 6 in the manner described hereinabove, the engagement projection 20 can be slipped into the engagement recess 67.

The use of the detent mechanism makes it possible to prevent the combination holder and battery charger to be inadvertently detached from the wall attachment 6 once the former has been mounted on the latter, to thereby securely and stably hold the combination holder and battery charger relative to the wall support 100. However, it may occur that the user wishes to remove the combination holder and battery charger from the wall attachment 6 for any reason. To facilitate removal of the combination holder and battery charger from the wall attachment 6, an upper edge portion of the engagement projection 20 which is situated on a trailing side with respect to the direction of mounting of the combination holder and battery charger onto the wall attachment 6 with the guide rails 62 slidingly received in the slide grooves 7 is downwardly inclined towards the wall attachment 6. A lower portion of the engagement projection 20 opposite to the upper edge portion that is inclined is left as a generally horizontally extending surface.

Accordingly, when the combination holder and battery charger is desired to be detached from the wall attachment 6, the user has to pull the housing 2 upwardly to allow the inclined upper edge portion of the engagement projection 20 to relatively slide over a generally right-angled upper edge of the engagement recess 67 and as the housing 2 is further pulled upwardly the combination holder and battery charger can be separated from the wall attachment 6.

Nineteenth Embodiment (FIGS. 25 and 26)

The detent mechanism employed in this embodiment shown in FIGS. 25 and 26 differs from that used in the embodiment of FIG. 24. As shown in FIGS. 25 and 26, a lower portion of the slide plate 12 of the holder 1 is formed with an engagement hole 16 extending completely across the thickness thereof, leaving a portion below the engagement hole 16 as an interfit region 17. On the other hand, an upper portion of the plate body 61 of the wall attachment 6 is formed with an engagement recess 68 so as to extend inwardly from an outer surface thereof, leaving a portion of the plate body 61 immediately above the engagement recess 68 as an engagement projection 69. The engagement recess 68 is used to receive therein the interfit region 17 and the engagement projection 69 is used to engage in the engagement hole 16 when the combination holder and battery charger is mounted on the wall attachment in a manner similar to that described in connection with the previously described embodiment.

When the combination holder and battery charger is desired to be mounted on the wall attachment 6 then secured to the support wall 100 by means of the set screws 64 with the engagement recess 68 and the engagement projection 69 facing in a direction opposite to the support wall 100, the housing 2 has to be lowered relative to the wall attachment 6 to allow the plate body 61 of the wall attachment 6 to be received in the slide space 21 through an opening therebelow while the guide rails 62 of the wall attachment 6 are slidingly guided in and along the slide grooves 7 in a manner similar to that shown in FIG. 2 and FIG. 5. At this time, as shown in FIG. 26, the interfit region 17 and the engagement recess 68 are engaged with each other while the engagement projection 69 is engaged in an engagement hole 16, thereby inhibiting any movement of the holder 1 relative to the wall attachment 6. In this condition, the housing 2 is then further lowered to complete fitting of the housing 2 to the wall attachment 6. In a condition in which the combination holder and battery charger is fitted to the support wall through the wall attachment 6 in the manner described above, the holder 1 is slid upwardly relative to the housing 2 and assumes the operative position.

On the other hand, when during an attempt to remove the combination holder and battery charger from the wall attachment 6 the housing 2 is pulled upwardly relative to the wall attachment 6, the holder 1 is slid downwardly relative to the housing 2 to assume the folded position, as shown in FIG. 26, since the movement of the holder 1 relative to the wall attachment 6 is inhibited by the engagement between the interfit region 17 and the engagement recess 68 and also the engagement between the engagement projection 69 and the engagement hole 16. Further upward pull of the housing 2 while the holder 1 having been returned to the folded position results in disengagement of the interfit region 17 from the engagement recess 68 and also disengagement of the engagement projection 69 from the engagement hole, thereby completing removal of the combination holder and battery charger from the wall attachment 6.

According to this embodiment, as the combination holder and battery charger with the holder 1 held at the folded position is mounted on the wall attachment 6, the holder 1 is automatically driven to the operative position. Similarly, as the combination holder and charges is pulled upwardly to remove it from the wall attachment 6, the holder 1 then held in the operative position is automatically retracted to the folded position. Accordingly, when the combination holder and battery charger is fitted to the support wall 10 for recharging the electric shaver 5 or when after the recharge the combination holder and battery charger is to be removed from the support wall 10, the user need not manipulate the holder 1 to move it between the folded and operative positions.

Twentieth Embodiment (FIGS. 27A and 27B)

In an embodiment shown in FIGS. 27A and 27B, the holder 1 is pivotally mounted on the housing 2. Specifically, the holder 1 shown therein includes the apertured holder plate 11 and a support leg 18 having one of its opposite sides pivotally connected with the apertured holder plate 11 by means of a hinge pin 19. When the holder 1 is in the folded position as shown in FIG. 27A, the apertured holder plate 11 and the support leg 18 are held flat against the top surface of the housing 2 with respective upper surfaces of the holder plate 11 and support leg 18 held in flush with each other, but when the holder 1 is in the operative position as shown in FIG. 27B, the support leg 18 is erected to assume an upright position perpendicular to the top surface of the housing 2 with the apertured holder plate 11 spaced a distance above the top surface of the housing 2.

According to this embodiment, when the holder 1 is pulled relative to the housing 1 with the slide plate 12 guided in and along the slide space 21 (FIG. 1) so as to assume the operative position, the other side of the support leg 18 remote from the hinge pin 19 slides along the top surface of the housing 2 and subsequently assumes the upright position, as shown in FIG. 27B. The support leg 18 in the upright position may be considered serving as a spacer to keep a distance between the holder 1 in the operative position and the top surface of the housing 2. Accordingly, the holder 1 can be stably held at the operative position.

Return of the holder 1 to the folded position can be effected by a single push to pivot the support leg 18 about the hinge pin 19 so that the support leg 18 can be flattened against the top surface of the housing 2.

Twenty-first Embodiment (FIG. 28)

The embodiment shown in FIG. 9 may be a modification of the previously described embodiment of FIGS. 27A and 27B. The support leg 18 is protected by a protecting protrusion 27a formed on the top surface of the housing 2 so as to protrude upwardly at a location on one side of the support leg 18 remote from the apertured holder plate 11. The amount of protrusion of this protecting protrusion 27a is so chosen that when the holder 1 is in the folded position as shown, an upper surface of the protecting protrusion 27a is in flush with an upper surface of any one of the support leg 18 and the apertured holder plate 11.

The presence of the protecting protrusion 27a is advantageous in that external impacts will not act directly on one side of the support leg 18 remote from the apertured holder plate 11, thereby to avoid any possible damage to the pivotal joint between the apertured holder plate 11 and the support leg 18 and also to the apertured holder plate 11.

The combination holder and battery charger according to any one of the foregoing embodiments of the present invention may be provided with a mirror 101 which will now be described with reference to FIGS. 29 to 33.

Twenty-second Embodiment (FIGS. 29 and 30)

In this embodiment shown in FIGS. 29 and 30, the mirror 101 is supported for pivotal movement between a folded position as shown in FIG. 29 and an erected position as shown in FIG. 30 about a hinge pin 102. The mirror 101 when in the folded position is positioned behind the slide plate 12 in face-to-face relation therewith while the mirror 101 when in the erected position raises upwardly with its mirror surface 105 usable to reflect an image of the user's face towards the user.

As shown therein, the apertured holder plate 11 has a rear side edge formed with a connecting edge 103 and, on the other hand, the mirror 101 has connecting tongues 102 formed with one side edge thereof. The apertured holder plate 11 is pivotally coupled with the mirror 101 with the connecting edge 103 received in between the connecting tongues 102 and connected therewith by means of the hinge pin 102.

According to this embodiment shown in FIGS. 29 and 30, when the mirror 101 is pivoted from the folded position towards the erected position, the mirror 101 can be used with its mirror surface 105 reflecting an image of the user's face.

Since the mirror 101 is incorporated in the combination holder and battery charger, the user need not carry a separate mirror with him.

Twenty-third Embodiment (FIGS. 31 and 32)

While in the foregoing embodiment of FIGS. 29 and 30 the mirror 101 is pivotable between the folded and erected positions about the hinge pin 102, the mirror 101 in this embodiment is slidable between the folded and erected positions. Specifically, an outer surface of the plate body 14 of the slide plate 12 facing in a direction counter to the housing 2 is formed with a generally rectangular mirror recess 107 opening not only in a direction counter to the housing 2, but also in a direction upwardly and downwardly, and opposite side walls confronting the mirror recess 107 adjacent the respective slide rails 15 are formed with slide grooves 108 that extend in a direction conforming to the direction of sliding movement of the slide plate 12.

On the other hand, the mirror 101 is so configured as to fit to the mirror recess 107 with its opposite sides formed with respective slide rails 106 slidingly engaged in the corresponding slide grooves 108. Thus, it will readily be seen that the mirror 101 can slide between the folded and erected positions with the slide rails 106 slidingly received in the corresponding slide grooves 108. It is to be noted that so long as the mirror 101 is held in the folded position, an outer surface of the mirror 101 is in flush with an outer surface of the slide plate 12.

The mirror surface 105 is formed on an inner surface of the mirror 101 and, accordingly, when the mirror 101 is in the erected position as shown in FIG. 32, the mirror surface 105 shown by the phantom line faces towards the user.

Even this embodiment of FIGS. 31 and 32 brings about advantages similar to those exhibited by the previously described embodiment of FIGS. 29 and 30.

Twenty-fourth Embodiment (FIG. 33)

In an embodiment shown in FIG. 33, the holder pocket 13 defined in the apertured holder plate 11 is adapted to be closed by the mirror 101 when the latter is not in use. Specifically, the mirror 101 has a connecting edge 109 formed integrally therewith so ad to protrude outwardly from a lower edge thereof and, on the other hand, one of longer sides of a peripheral wall defining the holder pocket 13 in the holder plate 11 is inwardly depressed to define a bearing recess 110 for receiving therein the connecting edge 109 integral with the mirror 101. The mirror 101 and the apertured holder plate 11 are pivotally connected together by means of a hinge pin 111 extending through the connecting edge 109 with its opposite ends engaged in respective set-back regions leaving the bearing recess 110 as shown by the phantom line.

The mirror 105 has an outer contour matching with the contour of the holder pocket 13 and, accordingly, so long as the mirror 101 is held in the folded position, the mirror 101 is completely received within the holder pocket 13 with its opposite surfaces held in flush with the upper and lower surfaces of the holder plate 11. The mirror surface 105 is defined on one surface of the mirror 101 so that, when the mirror 101 is in the erected position as shown, the mirror surface 105 can face towards the user.

The embodiment of FIG. 33 can bring about advantages similar to those brought about by the respective embodiments shown in FIGS. 20 and 30 and FIGS. 31 and 32. However, an additional advantage can be appreciated in that since the mirror when in the folded position is completely accommodated within the holder pocket 13, the combination holder and battery charger is rather compact in size and is therefore convenient for transportation.

Although the present invention has been described in connection with the preferred embodiments thereof with reference to the accompanying drawings, it is to be noted that various changes and modifications are apparent to those skilled in the art. It is also to be noted that some of the embodiments of the present invention can be combined with any of the remaining embodiments of the present invention. For example, the idea envisioned by the embodiment shown in FIGS. 20 and 21 can be adapted in any one of the remaining embodiments of the present invention.

Accordingly, such changes and modifications are therefore to be understood as included within the scope of the present invention as defined by the appended claims, unless they depart therefrom.

What is claimed is:

1. A combination holder and battery charger comprising:
   a housing having top and bottom surfaces opposite to each other, said housing accommodating therein a battery charger for recharging an electric appliance;
   a holder mounted on the housing for sliding movement between folded and operative positions, said holder, when slid to the operative position, holding the electric appliance relative to the housing during recharging of the electric appliance; and
   an auxiliary base stand disposed on the bottom surface of the housing and capable of assuming one of first and second positions, at least a portion of the auxiliary base stand when the latter is in the first position protruding laterally outwardly from a contour of the bottom surface of the housing, but that portion of the auxiliary base stand when the latter is in the second position being folded to be encompassed within the contour of the bottom surface of the housing.

2. The combination holder and battery charger as claimed in claim 1, wherein the auxiliary base stand is pivotally connected to the bottom surface of the housing by means of a bearing boss for pivotal movement between the first and second positions.

3. The combination holder and battery charger as claimed in claim 1 or 2, wherein the holder comprises a holder plate and a slide plate lying perpendicular to the holder plate, said slide plate when the holder moves between the folded and operative positions sliding along a surface of the housing lying perpendicular to any one of the top and bottom surfaces thereof, and wherein a portion of the auxiliary base stand which aligns with a lower end of the slide plate when the auxiliary base stand is in the second position is depleted to define an access recess.

4. The combination holder and battery charger as claimed in claim 1, further comprising a camming rib mounted on the auxiliary base stand for driving the holder at least from the folded position towards the operative position in response to movement of the auxiliary base stand from the second position towards the first position.

5. The combination holder and battery charger as claimed in claim 2, further comprising a geared transmission mechanism for transmitting movement of the auxiliary base stand between the first and second positions to the holder to thereby drive the holder between the folded and operative positions.

6. The combination holder and battery charger as claimed in claim 2, wherein the auxiliary base stand comprises a plurality of base plates.

7. The combination holder and battery charger as claimed in claim 6, further comprising a gear member rotatable in unison with pivotal movement of the base plates, said base plates being drivingly connected with respective gear elements to synchronize the pivotal movement of the base plates between the folded and operative positions.

8. The combination holder and battery charger as claimed in claim 1, wherein the auxiliary base stand is supported for sliding movement between the first and second positions along the bottom surface of the housing.

9. The combination holder and battery charger as claimed in claim 1, wherein the auxiliary base stand comprises a plurality of base plates supported for sliding movement between the first and second positions along the bottom surface of the housing, and further comprising a rack formed in each of the base plates and an intermediate gear positioned between the neighboring base plates in mesh with the associated racks to thereby synchronize movement of the base plates between the first and second positions.

10. The combination holder and battery charger as claimed in claim 1, wherein the auxiliary base stand is provided with a cable retainer for retaining an electric cable of the electric appliance when the auxiliary base stand is in the second position.

11. The combination holder and battery charger as claimed in claim 10, wherein the cable retainer is mounted on the auxiliary base stand for pivotal movement between folded and erected positions.

12. The combination holder and battery charger as claimed in claim 11, wherein the cable retainer comprises a plurality of retainer segments pivotally connected in series with each other.

13. The combination holder and battery charger as claimed in claim 10, wherein the cable retainer is provided with a plug constraint for holding a plurality of plug elements of an electric connector plug of the electric appliance.

14. The combination holder and battery charger as claimed in claim 1, wherein the auxiliary base stand is formed with an accommodating means for accommodating at least one attachment of the electric appliance.

15. The combination holder and battery charger as claimed in claim 1, wherein the top surface of the housing is formed with a projection engageable in a recess formed in a bottom of the electric appliance when the latter is mounted on the housing for recharging.

16. The combination holder and battery charger as claimed in claim 1, further comprising a wall attachment adapted to allow the combination holder and battery charger to be hung on and supported by a support wall.

17. A combination holder and battery charger comprising:
    a housing having top and bottom surfaces opposite to each other and a side surface lying perpendicular to any one of the top and bottom surfaces, said housing accommodating therein a battery charger for recharging an electric appliance, said housing having slide grooves formed on the side surface thereof so as to extend in a direction perpendicular to any one of the top and bottom surfaces and spaced a distance from each other;
    a holder mounted on the housing for sliding movement between folded and operative positions for holding the electric appliance relative to the housing when moved to the operative position, said holder comprising a holder plate and a slide plate lying perpendicular to the holder plate, said slide plate having opposite side edges formed with respective slide rails slidingly engageable in the associated slide grooves in the housing to enable the holder to be moved between the folded and operative positions with the holder plate moving close towards and away from the top surface of the housing; and
    a wall attachment plate having guide rails formed therewith, each of said guide rails slidingly engageable in the associated slide groove in the housing.

18. The combination holder and battery charger as claimed in claim 17, wherein the guide rails of the wall attachment plate are capable of being press-fitted in, but slidably engaged in the respective slide grooves in the housing.

19. The combination holder and battery charger as claimed in claim 17 or 18, further comprising an auxiliary base stand disposed on the bottom surface of the housing and capable of assuming one of first and second positions, at least a portion of the auxiliary base stand when the latter is in the first position protruding laterally outwardly from a contour of the bottom surface of the housing, but that portion of the auxiliary base stand when the latter is in the second position being folded to be encompassed within the contour of the bottom surface of the housing, and wherein the slide plate has a lower end positioned laterally of the auxiliary base stand, then held in the second position, when the holder is moved to the folded position.

20. The combination holder and battery charger as claimed in claim 17 or 18, wherein the wall attachment plate is formed with a base support lying perpendicular thereto for support of the bottom surface of the housing.

21. The combination holder and battery charger as claimed in claim 17 or 18, further comprising a retaining structure defined between the wall attachment plate and the housing for retaining the housing relative to the wall attachment plate when the guide rails of the wall attachment plate are engaged in the slide grooves in the housing.

22. The combination holder and battery charger as claimed in claim 17 or 18, further comprising a retaining structure defined between the wall attachment plate and the slide plate of the holder for retaining the housing relative to the wall attachment plate when the guide rails of the wall attachment plate are engaged in the slide grooves in the housing.

23. The combination holder and battery charger as claimed in claim 17 or 18, further comprising a support leg operatively coupled with the holder plate for supporting the holder plate above the top surface of the housing when the holder is moved to the operative position.

24. The combination holder and battery charger as claimed in claim 23, further comprising a protecting portion for protecting the support leg when the holder is moved to the folded position.

25. The combination holder and battery charger as claimed in claim 17, further comprising a mirror pivotally mounted on the holder plate.

26. The combination holder and battery charger as claimed in claim 17, further comprising a mirror mounted on the slide plate for sliding movement relative to the slide plate.

27. The combination holder and battery charger as claimed in claim 17 or 18, wherein the holder plate has a holder pocket defined therein for support of the electric appliance when the electric appliance is inserted therethrough, and further comprising a mirror pivotally supported by the holder plate for movement between a folded position in which the mirror is completely received within the holder pocket, and an erected position in which the mirror lies perpendicular to the holder plate.

28. The combination holder and battery charger as claimed in claim 17 or 18, wherein the top surface of the housing is formed with a projection engageable in a recess formed in a bottom of the electric appliance when the latter is mounted on the housing for recharging.

* * * * *